(12) United States Patent
Rausch et al.

(10) Patent No.: US 9,947,357 B2
(45) Date of Patent: Apr. 17, 2018

(54) READ/WRITE HEAD WITH INTEGRATED SWITCH NETWORK

(71) Applicant: Seagate Technology LLC, Cupertino, CA (US)

(72) Inventors: Tim Rausch, Farmington, MN (US); Jon D. Trantham, Chanhassen, MN (US); Jason Bryce Gadbois, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/086,959

(22) Filed: Mar. 31, 2016

(65) Prior Publication Data

US 2017/0287514 A1    Oct. 5, 2017

(51) Int. Cl.
*G11B 5/60* (2006.01)

(52) U.S. Cl.
CPC .................................. *G11B 5/607* (2013.01)

(58) Field of Classification Search
None
See application file for complete search history.

(56) References Cited

U.S. PATENT DOCUMENTS

| | | |
|---|---|---|
| 5,426,758 A | 6/1995 | Candelaria et al. |
| 5,541,780 A | 7/1996 | Han |
| 5,805,386 A | 9/1998 | Faris |
| 6,111,718 A | 8/2000 | Jones |
| 6,628,467 B2 | 9/2003 | Cyrusian |
| 7,835,104 B2 * | 11/2010 | Yamashita ............. G11B 5/455 360/75 |
| 8,665,547 B1 | 3/2014 | Yeo et al. |
| 8,824,249 B2 * | 9/2014 | Erden ................. G11B 5/02 369/13.26 |
| 8,922,939 B1 * | 12/2014 | Knigge ............... G11B 5/607 360/75 |
| 9,001,453 B1 * | 4/2015 | Knigge ............... G11B 5/6076 360/75 |
| 9,202,490 B2 * | 12/2015 | Zuckerman .......... G11B 5/4866 |
| 2005/0152067 A1 | 7/2005 | Yip et al. |
| 2011/0249361 A1 | 10/2011 | Matthew et al. |
| 2013/0155538 A1 | 6/2013 | Contreras |
| 2015/0077879 A1 | 3/2015 | Contreras |

OTHER PUBLICATIONS

File History for U.S. Appl. No. 15/056,755 as retrieved from the U.S. Patent and Trademark Office on Dec. 20, 2016, 75 pages.

* cited by examiner

*Primary Examiner* — K. Wong
(74) *Attorney, Agent, or Firm* — Hollingsworth Davis, LLC

(57) ABSTRACT

A read/write head has a set of components that at least include: at least one clearance actuator; at least one read transducer configured to read from a magnetic recording medium; and at least one write transducer configured to write to the magnetic recording medium. A switch network is coupled to the set of components and configured to, in response to a control signal, couple a selected sub-combination of the components to a common set of signal lines. The coupling of the selected sub-combination facilitates operation in a selected mode of the read/write head.

21 Claims, 7 Drawing Sheets

READ/WRITE HEAD WITH INTEGRATED SWITCH NETWORK

SUMMARY

Various embodiments described herein are generally directed to a read/write head with an integrated switch network. In one embodiment, a read/write head has a set of components that includes: at least one clearance actuator; at least one read transducer configured to read from a magnetic recording medium; and at least one write transducer configured to write to the magnetic recording medium. A switch network is coupled to the set of components and configured to, in response to a control signal, couple a selected sub-combination of the components to a common set of signal lines. The coupling of the selected sub-combination facilitates operation in a selected mode of the read/write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
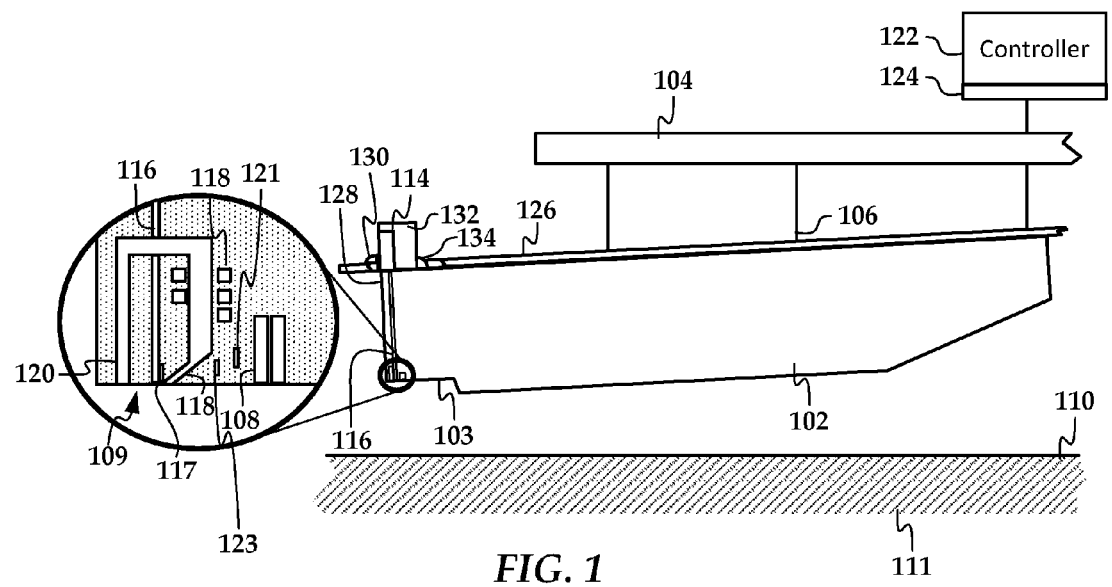
FIGS. 1 and 2 are side and perspective views of a read/write head according to an example embodiments.

The present disclosure generally relates to magnetic data storage device such as hard disk drives (HDDs). Conventional HDD architectures using perpendicular magnetic recording (PMR) technology are close to the superparamagnetic limit, which restricts the minimum bit size on magnetic recording media. New technologies, such as heat-assisted magnetic recording (HAMR) and bit-patterned media (BPM), can record data at target higher areal density (AD) than PMR assuming conventional one-dimensional (1-D) system designs and drive architectures. In contrast, the magnetic media surface, in principle, provides a two-dimensional (2-D) recording environment.

In parallel with HAMR and BPM, the existing design constraints are being further explored to see if the current recording technologies such as HAMR or BPM can support higher AD and/or better drive performance. This may be achieved by modifying some of those constraints to make the system utilize the 2-D nature of the media surface, which is called Two-Dimensional Magnetic Recording (TDMR). This technology also includes single track-of-interest version, what is known as multi-sensor magnetic recording (MSMR).

A TDMR drive includes multiple read transducers (readers) built onto the same head-gimbal assembly (HGA). The readers may be arranged such that different readers or groups of readers cover different regions or recording zones of the media, and the signals from the readers can be read separately or combined. A TDMR drive can combine multiple read signals in a number of ways. For example, multiple read signals may be used to reduce the effects of adjacent-track interference by reading signals from a target track and at least part of an adjacent track. In other cases, a TDMR device may be configured to simultaneously decode two or more tracks in parallel.

Interlaced magnetic recording (IMR) is a recording technique that writes adjacent tracks with differing recording characteristics. A drive utilizing IMR may utilize multiple write elements (writers) on each recording head to improve qualities of the recorded signal. An IMR device generally writes adjacent tracks at different track widths, e.g., by utilizing narrower and wider write elements. Adjacent tracks may also be written at different linear bit densities. Generally, data of narrow, interlaced data tracks overwrites edges of adjacent and previously written wider data tracks. Similar to shingled media recording (SMR), IMR allows writing narrower tracks that would not otherwise be possible using a conventional track arrangement, but without some of the constraints of SMR.

A conventional PMR HGA includes a single read/write head having a single writer (e.g., write pole) and reader (e.g., magnetoresistive sensor). This reader/writer will be used across the whole surface of the magnetic storage medium for all zones and stages of data recovery. In contrast, a TDMR drive may use different readers and/or writers over different regions of the disk. This can optimize some aspects of the performance, e.g., provide improved performance in high skew regions of the disk.

One challenge in implementing TDMR relates to the number of bond pads on the slider. A flex circuit is bonded (e.g., soldered) to these bond pads and carries the signal along an actuator arm to the system controller circuitry (e.g., preamplifiers, read/write channels). If each additional read or write transducer requires one or more additional bond pads, this could either increase the size of the recording head, or decrease the pitch of the bond pads. Both of these can add to the cost to the recording head. In embodiments below, a read/write head includes features that help to minimize the number of interconnections required for coupling multiple read/write transducers to controller circuitry.

The need for additional bond pads can also be an issue in HAMR drives. A HAMR drive uses an energy source (e.g., a laser diode) that requires signal lines. The energy source is activated to heat the recording medium when writing data. For closed loop control of the energy source, an additional sensor (e.g., photodetector) may be incorporated on or in the recording head. The energy source also heats the recording head due to losses, stray light, etc., and this may drive the need for additional components in the recording head. For example, a recording head may control clearance between the head and the recording medium via heat (e.g., by activating a resistive heater), and the laser heating may complicate clearance control. As such, a HAMR recording head may include additional components (e.g., multiple heaters, multiple thermal sensors) that help ensure clearances can be accurately controlled in this thermal environment. These additional components will add to the number of bond pads used on the head.

In the description below, methods and apparatuses are described that can reduce the number of head-to-controller signal lines and bond pads needed for TDMR and HAMR read/write heads. The block diagram of FIG. 1 shows a side view of a read/write head 102 according to an example embodiment. The read/write head 102 may be used in a data storage device, e.g., HAMR magnetic hard disk drive (HDD) and/or TDMR HDD. The read/write head 102 may also be referred to herein as a slider, read head, recording head, write head, magnetic head, etc. The read/write head 102 is coupled to an arm 104 by way of a suspension 106, e.g., a gimbal. The read/write head 102 includes at least one read transducer 108 and at least one write transducer 109 at a media-facing surface 103 (e.g., air-bearing surface, or ABS). The transducers 108, 109 are held proximate to a surface 110 of a magnetic recording medium 111, e.g., magnetic disk.

In this example, the read/write head 102 is configured for HAMR, and includes a laser 114 coupled to an optical path 116 integrated into the read/write head 102. The optical path 116 delivers energy to a near-field transducer 117 that is part of the write transducer 109. The near-field transducer 117 achieves surface plasmon resonance in response to the optical energy, and directs the surface plasmons to heat a surface of the recording medium 111 when recording data. The write transducer 109 also includes a write coil 118, write pole 119, and return pole 120. While the recording medium 111 is being heated, the write coil 118 is energized to create a magnetic field that is directed to the recording medium via a respective write pole 119 and return pole 120.

If the read/write head 102 is configured for non-HAMR recording (e.g., PMR), then the laser 114, optical path 116, and near-field transducer 117 would not be included. The write coil 118, write pole 119, and return pole 120 would be included for most non-HAMR recording heads. Whether or not the read/write head is configured for HAMR, it may include more than one write transducer 109. The multiple write transducers 109 may include independent and separate coils 118 and write poles 119 for all configurations, and HAMR devices with more than one writer may also include independent and separate lasers 114, optical paths 116, and near-field transducers 117. The multiple write transducers 109 may be separated in a cross-track and/or downtrack direction.

If the read/write head 102 is configured for TDMR, then it may include more than one read transducer 108. The multiple read transducers 108 may include separate and independent sensors (e.g., magnetoresistive sensor stacks) that may have separate or common magnetic shielding. The multiple read transducers 108 may be separated in a cross-track and/or downtrack direction. Generally, the type and arrangement of multiple reader transducers 108 may be independent of the number of write transducers 109 as well as the type of recording technology (e.g., HAMR, PMR).

The read/write head 102 includes one or more fly-height actuators 121 (e.g., heater) proximate the read and write transducers 108, 109. Electrical power is applied to the fly-height actuator 121, causing a local protrusion at the media facing surface 103. By varying the power, the protrusion can be controlled to set a desired separation between the transducers 108, 109 and the media surface 110. A sensor 123 may be included to detect a local temperature and be used for closed-loop feedback control of the heater 121 (and/or to calibrate open-loop control of the heater 121). For example, a resistive material with a known temperature coefficient of resistance (TCR) can be used to detect temperature for HMS control and other purposes A controller 122 includes logic circuits that control current supplied to the laser 114, as well controlling the as sending and receiving of signals to and from the read/write head 102. Those signals include read and write channel data from the transducers 108, 109 and adaptive fly height signals sent to the fly height actuator 121. The signals processed by the controller 122 may also include sensor signals such as photodetectors, temperature sensors, etc. An interface 124 conditions the signals between the controller 120 and the read/write head, performing pre-amplification, filtering, analog-to-digital conversion, digital-to-analog conversion, encoding, decoding, etc.

Signals are carried between the read/write head 102 and the controller 122 via a flex circuit 126 that extends from a trailing edge 128 of the read/write head 102 and along the arm 104. The flex circuit 126 includes a flexible insulator with conductive traces on one or both sides. The flex circuit 126 is coupled to the read/write head 102 via a first set of connections 130, which may include pads, solder bumps, wire bonds, etc. In order to reduce the number of the first set of connections 130, a switch network 132 is mounted on a surface (e.g., top surface) of the read/write head 102.

In this example, the switch network 132 is also configured as a submount that provides physical support for the laser 114. For non-HAMR implementations, the switch network may be fabricated together with the read/write head 102 or formed separately and attached to a surface of the read/write head 102. The switch network 132 will be described in more detail below, but generally the switch network has a second set of connection 134 that are coupled to a set of components within the read/write head 102 (e.g., transducers 108 and 109, fly height actuator 121, etc.). The number of the second connections 134 is less than a number of the first connections 130. The switch network 132 switches a subset of the second connections 134 to the first connections 130 based on a mode of the read/write head 102. This switching results in a sub-combination of the components being coupled to a common set of signal lines based on the selected mode.

Figure 2:
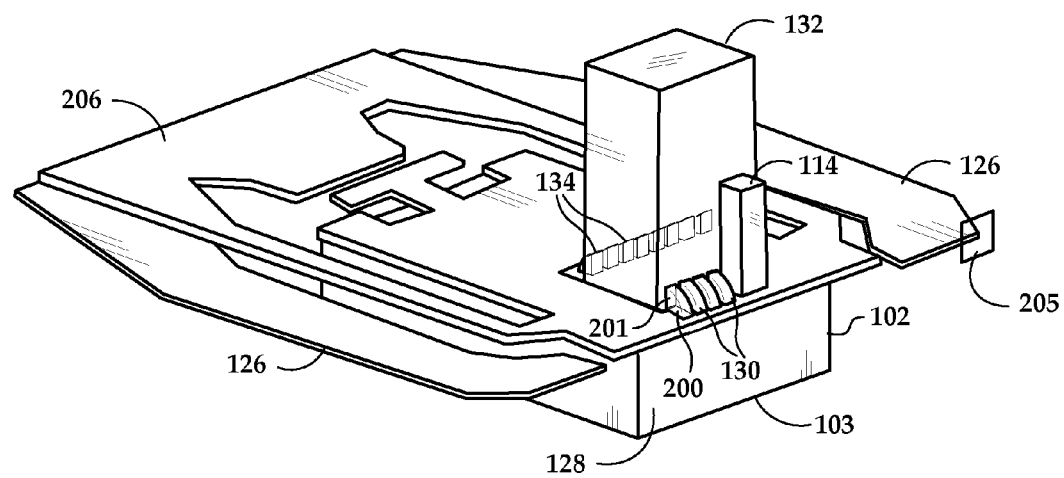

In FIG. 2, a perspective view shows a head-gimbal assembly that includes the read/write head 102 of FIG. 1. Portions of the flex circuit 126 are cut away along plane 205 in this illustration to make it easier to view the trailing edge 128 of the read/write head 102. The flex circuit 126 electrically interfaces with the switch network/submount 132 via first connections 130, which are represented here as solder bumps, although may include other connection types, e.g., wire bonds. Shown in hidden line are pads 200, 201 that may be included on the flex circuit 126 and switch network/submount 132. Similar pads and connections may also or instead be provided on an area on underside of the flex circuit 126. On the far side of the switch network/submount 132, second connections 134 are shown that interface with a top surface of the read/write head 102, the top surface being opposed to the media facing surface 103.

Figure 3:
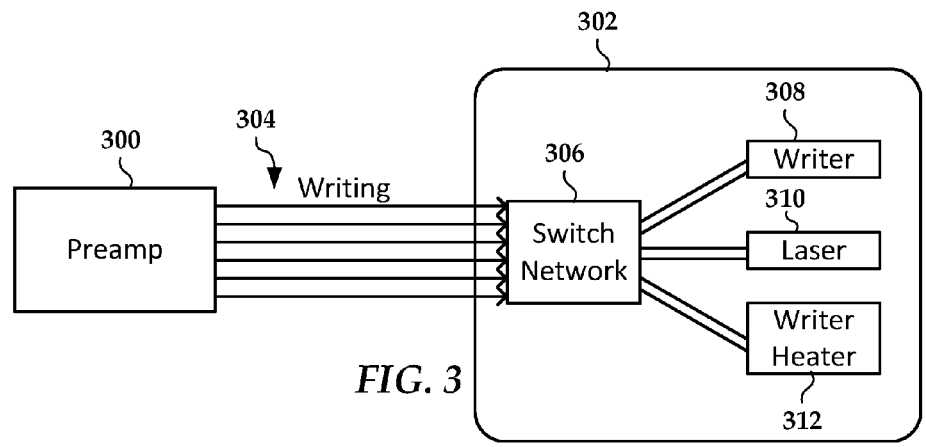
FIGS. 3, 4, and 5 are block diagrams showing component sub-combinations and modes for a data storage apparatus according to an example embodiment.
Figure 4:
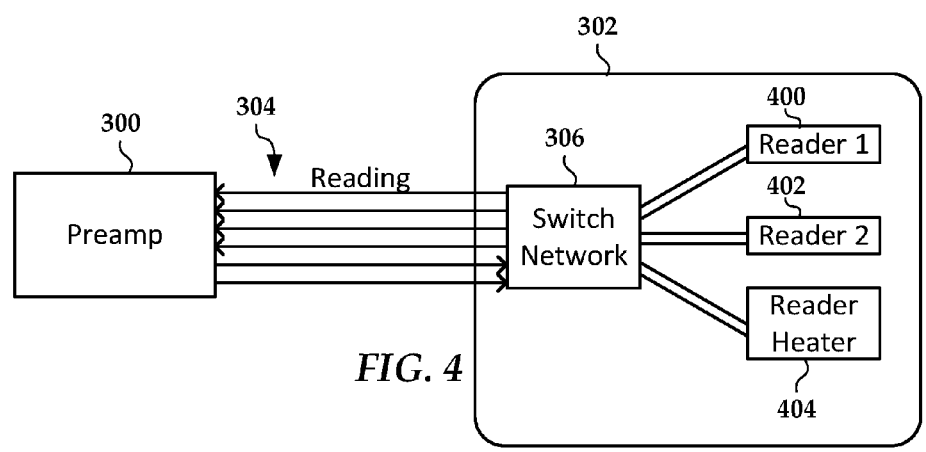
Figure 5:
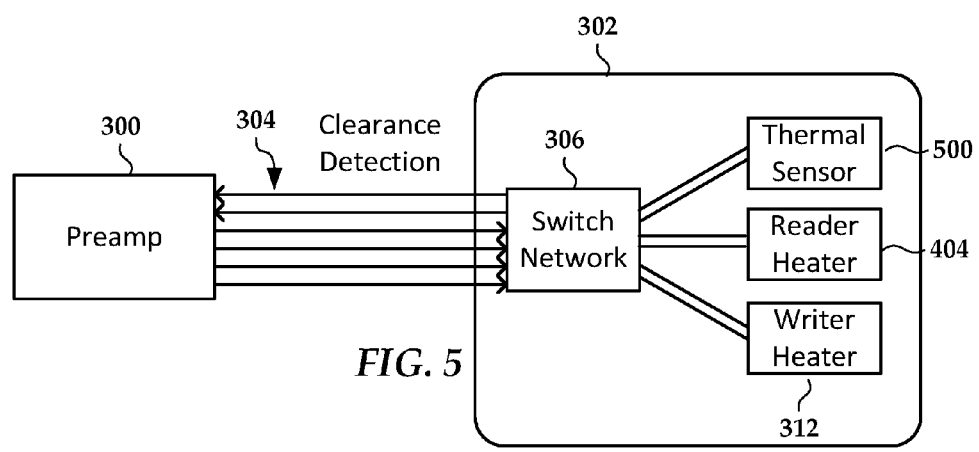

The switch network 132 includes integrated electronics that perform as an electronically controlled switch. This allows switching a sub-combination of the second connections 134 to the first connections 130 depending on a current mode of the read/write head 102. This allows increasing the number of functional components integrated into the slider without a corresponding increase in the number of first connections 130 and traces on the flex circuit 126. In FIGS. 3-5, block diagrams illustrate component sub-combinations and modes for a data storage apparatus according to an example embodiment.

The storage device includes a preamplifier 300 and a read/write head 302 coupled via commonly-shared signal lines 304. The read/write head 302 includes a switch network 306, a write transducer 308 (e.g., write coil), an energy source 310 (e.g., laser), a write clearance actuator 312 (e.g., heater), first and second read transducers 400, 402 (e.g., magnetoresistive stacks), a read clearance actuator 404 (e.g., heater) and a thermal sensor 500 (e.g., TCR sensor). The diagrams in FIGS. 3-5 show how the sub-combinations of the components are switched onto the signal lines 304 based on a current mode of the read/write head 302, e.g., a task the read/write head 302 is currently being directed to perform by a controller.

In FIG. 3, the read/write head 102 is set to a writing mode, in which case the write transducer 308, energy source 310 and write clearance actuator 312 will receive signals from the preamplifier 300 via the signal lines 304. For a non-HAMR read/write head, another component such as thermal sensor 500 may be coupled to the lines 304 instead of the energy source 310. In such a case the thermal sensor 500 can provide closed-loop feedback control for the writer clearance actuator 312. In FIG. 4, the read/write head 102 is set to a reading mode, in which case the read transducers 400, 401 send signals to the preamplifier 300 via the signal lines 304 and read clearance actuator 404 receives signals from the preamplifier 300 via the signal lines 304. In FIG. 5, the read/write head 102 is set to a clearance-detection mode, in which head-to-media clearance response is tested, set, calibrated, etc. In this mode, write clearance actuator 312 and read clearance actuator 404 receive signals from the preamplifier 300 via the signal lines 304, and thermal sensor 500 sends signals to the preamplifier via the signal lines 304.

The read/write head in the example of FIGS. 3-5 has distinct modes, e.g., reading, writing, clearance calibration. However, there may be other types of modes that are similar to one another. For example, there may be two or more reading modes where different combinations of read transducers are selected for reading based on, e.g., conventional versus TDMR recording, current media zone, etc. Similarly, for technologies such as IMR, different writers may be used to write respectively wider and narrower tracks, and these may be selected to during different narrow and wider writing modes.

Figure 6:
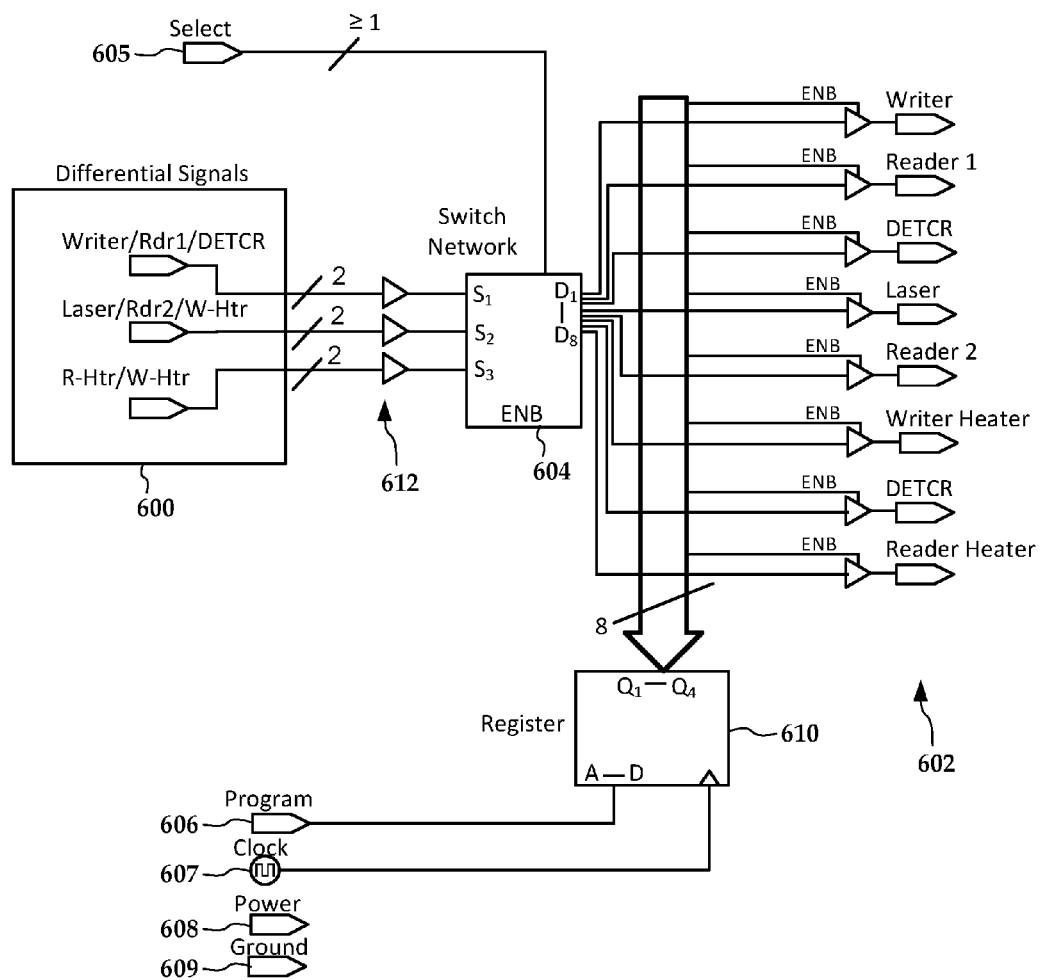
FIG. 6 is a circuit diagram showing a switch network integrated with a read/write head according to an example embodiment.

In FIG. 6, a circuit diagram shows a switch network that is integrated with a read/write head according to an example embodiment. In this example, there are six traces used on the flex circuit that couples a common set of signal lines 600 between the read/write head and preamplifier/controller. The common signal lines 600 are differential input/output lines. The common signal lines 600 may carry signals to/from any sub-combination of components 602, the selection being made by switch network 604, which switches and routes the signals to the correct components 602. For purposes of this disclosure, the term "common set of signal lines" is intended to describe that the signal lines 600 are commonly-accessible by two or more different internal read/write head components 602, e.g., used by different components at different times based on a state/mode of the switch network 604.

In this example, two components 602 are shown duplicated, namely thermal sensors which are identified in the diagram as dual-ended TCR (DETCR) sensors. Various combinations of devices may be used depending on the embodiment and a fixed count of devices is not required to be used at any one time, e.g., 3 pairs of I/O lines does not require that three devices be used simultaneously. In other embodiments, a spare/duplicate component may be provided and switched in under some conditions. For example, two DETCR sensors may be provided in the read/write head, and a different DETCR selected for use based on detecting read or write clearance, current media zone, age, component failure, ambient temperature, etc.

Also shown in FIG. 6 are lines 605-609, which represent control and power lines carried by the flex circuit to the read/write head. Generally, the switch network 604 may add two lines (power and ground 608, 608) in addition to signal lines 600 and at least one control line. In one embodiment, one or more select lines 605 are used to provide binary control signals that switch between N states based on a combination of the binary line values. In such a case, $\log_2 N$ select lines 605 will be used, rounded up to the nearest integer. For example, if three states are used (e.g., corresponding to modes shown in FIGS. 2-4), then two select lines 605 would be used. Two select lines 605 would support up to four states/modes (00, 01, 10, 11).

Alternatively, the switch network 604 can be combined with a shift register 610 (or other logic memory device) to read the selection state during use. The register 610 can be quickly reprogrammed to enable the correct line pairings each time a particular mode is selected. The register 610 could be implemented using only two additional lines (program 606 and clock 607, in addition to the ground 609) to program an arbitrary number of modes/states. The selected mode/state is transmitted as a time-series of bits over the program line 606, the bits being collected and temporarily stored in the register 610. Generally, the register 610 controls which components 602 are switched via enable (ENB) lines. In such a case, the select lines 605 would not be activated externally (e.g., via a preamplifier) but could be activated by the register 610. The shift register/memory 610 may be integrated directly with the switch network 604 and does not need to be a discrete device.

Because the flex circuit traces will be shared amongst devices with differing impedances, the switch network 604 may be paired with impedance matching buffers 612. The logic to configure/switch the buffers 612 in the read/write head may be provided by the switch network 604 and/or register 610. Similar impedance matching can be performed on the preamplifier side of the trace gimbal assembly and switched in conjunction with the read/write head side.

The above example can be extended and generalized to include more elements and additional pairs of lines. In addition, similar functionality may be provided in some cases by providing fewer signal lines. For example, if some components can utilize a common return line, then one pair of the differential signal lines 600 may instead be a single line. The ground line 609 may also be used as a return path for one or more of the signals lines 600.

Figure 7:
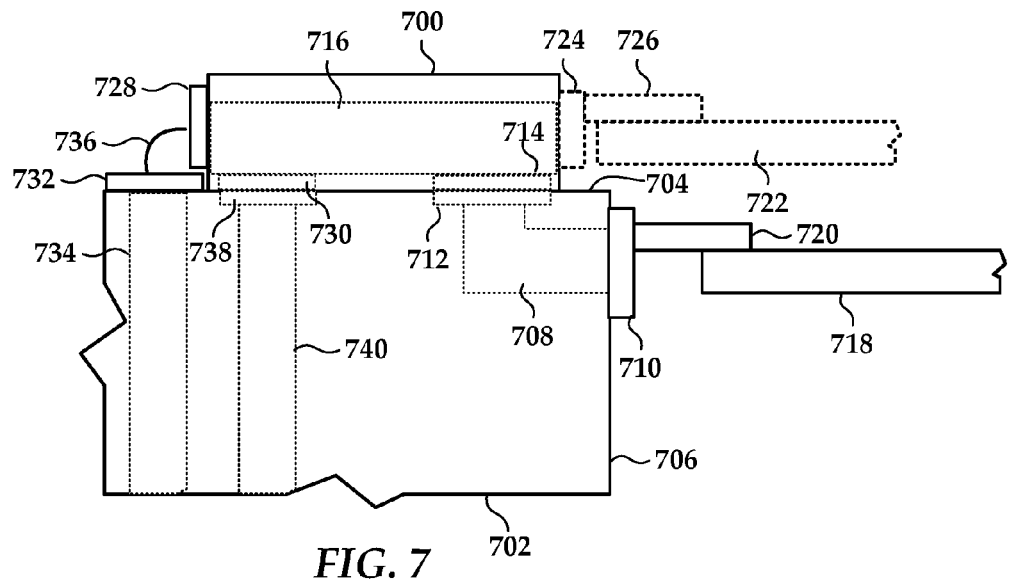
FIGS. 7 and 8 are block diagrams showing physical attachment of a switch network to a slider body according to an example embodiments.

In FIG. 7, a block diagram shows physical attachment of switch network 700 to a slider body 702 according to an example non-HAMR embodiment. Top bond pad technology has been developed to attach a laser to a top surface of a slider body, and this can be extended to top-attachment of switch network 702. This top bond pad technology allows signals to be routed from a top surface 704 of the slider 702 to a trailing edge 706. For example, the slider body 702 704 may include internally formed conductive paths 708 (e.g., vias, conductive trace layers) that couple slider-located trailing edge pads 710 to top pads 712. Paths formed on an outer surface of the slider body 702 may be used in addition to or instead of internal conductive paths 708. The top pads 712 may be underneath and/or outside of the switch network 700.

The switch network 700 has bottom (or side) pads 714 that are electrically coupled to internal circuitry 716, e.g., integrated logic circuits formed using photolithography that perform the decoding functionality described herein. The trailing edge pads 710 are coupled to a flex circuit 718 via bonds 720 (e.g., solder, wire bonds). The trailing edge pads 710 and bonds 720 form first connections that carry signals between the slider body 702 and system circuitry (e.g., controllers, read/write channels, etc.) via the flex circuit 718.

In an alternate embodiment, the first connections may be made directly between a flex circuit 722 and switch-network-located trailing edge pads 724 via bonds 726. In such an embodiment, the pads 724 may be directly coupled into the integrated circuitry 716 of the switch network 700. In either embodiment, the switch network 700 is coupled to internal components of the slider body 702 (e.g., read/write transducers, sensors, clearance actuators, etc.) via side pads 728 and/or bottom pads 730. The side pads 728 are coupled to top pads 732 of the slider body 706, which carry the signals to internal components via conductive paths 734 (e.g., vias, conductive trace layers). In the case that side pads 728 on the switch network 700 are connected to top bond pads on the slider, this coupling may be achieved by using bonds 736, e.g., wire bonds or solder. The side pads 728 may be included on any outer surface of the switch network 700, and not just the surface shown in the figure.

The switch network 700 may use bottom pads 730 which are located over (e.g., overlap when viewed from the top) top pads 738 of the slider body 702. These pads 730, 738 (as well as pads 712, 714) may be bonded by placement of the switch network 700 on the slider body with solder bumps applied to one or both of the pads 730, 738, followed by a reflow which melts the solder. Similar to top pads 732, signals from the top pads 738 are carried to internal components via conductive paths 740.

Figure 8:
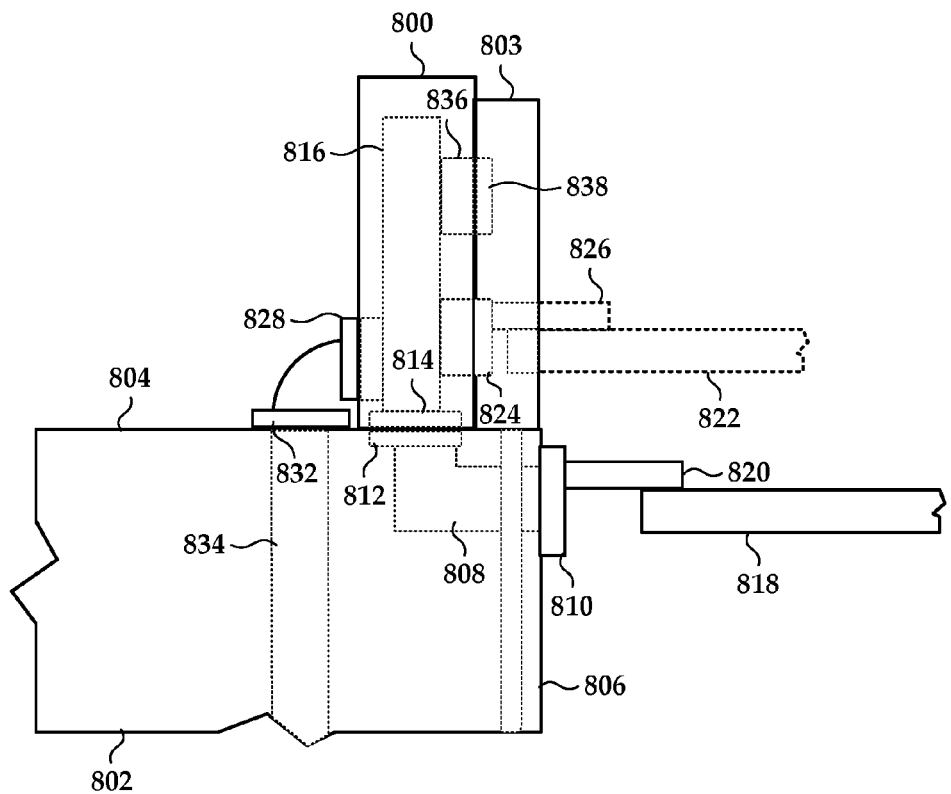

In FIG. 8, a block diagram shows physical attachment of a switch network 800 to a slider body 802 according to an example HAMR embodiment. The top-attached switch network 802 also acts as a submount for an energy source 803, e.g., laser diode. Signals can be routed from a top surface 804 of the slider 802 to a trailing edge 806 using conductive paths 808 (e.g., vias, conductive trace layers) formed within the slider body 802 that couple slider-located trailing edge pads 810 to top pads 812. The top pads 812 may be underneath and/or outside of the switch network 800. Note that in this case, the conductive paths 808 will be formed so as not to interfere with an optical path 809 (e.g., waveguide) used to deliver light from the laser to the recording medium. Paths formed on an outer surface of the slider body 802 may be used in addition to or instead of internal conductive paths 808.

The switch network 800 has bottom (or side) pads 814 that are electrically coupled to internal logic circuitry 816, e.g., integrated circuits formed using photolithography that perform the decoding functionality described herein. The trailing edge pads 810 are coupled to a flex circuit 818 via bonds 820 (e.g., solder, wire bonds). The trailing edge pads 810 and bonds 820 form first connections that carry signals between the slider body 802 and system circuitry (e.g., controllers, read/write channels, etc.) via the flex circuit 818.

In an alternate embodiment, the first connections may be made directly between a flex circuit 822 and switch-network-located trailing edge pads 824 via bonds 826. In such an embodiment, the pads 824 may be directly coupled into the integrated circuitry 816 of the switch network 800. In either embodiment, the switch network 800 is coupled to internal components of the slider body 802 (e.g., read/write transducers, sensors, clearance actuators, etc.) via side pads 828. The side pads 828 are coupled to top pads 832 of the slider body 806, which carry the signals to internal components via conductive paths 834 (e.g., vias, conductive trace layers). This coupling is achieved by using bonds 836, e.g., wire bonds or solder. The side pads 828 may be included on any outer surface of the switch network 800, and not just the surface shown in the figure. While not shown, the switch network 800 may include additional bottom pads to carry signals to internal slider components (e.g., similar to pads 730 in FIG. 7).

Because the switch network 800 is configured as a submount, it may also include pads 834 that are bonded with corresponding pads of the energy source 803. The energy source 803 may be bonded to the switch network 800 to form a laser-diode unit (LDU) assembly that is later bonded to the slider body 802. These pads 834 may be between mounting surfaces and bonded via a reflow operation, or on side surfaces and bonded via external solder joints and/or wire bonds.

Figure 9:
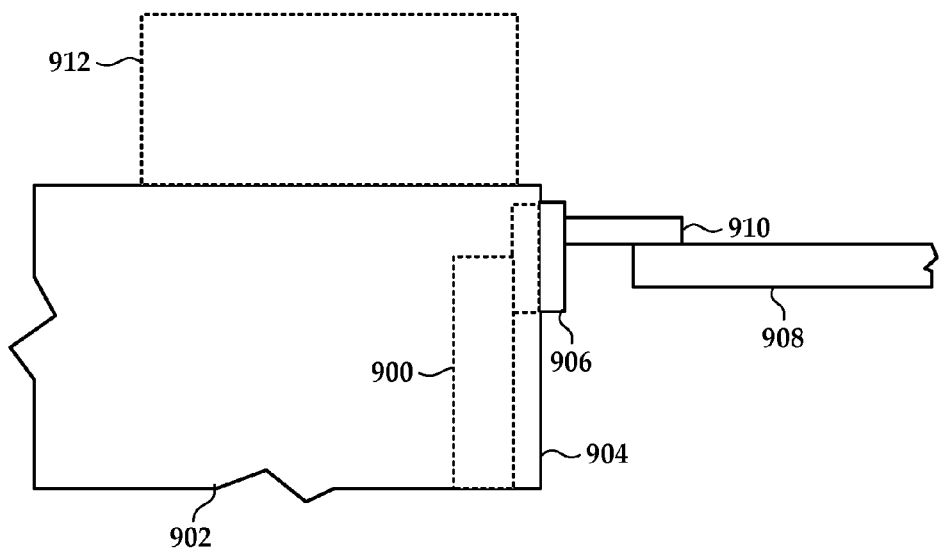
FIGS. 9 and 10 are a block diagrams showing a switch network fabricated as part of a slider body according to an example embodiments.
Figure 10:
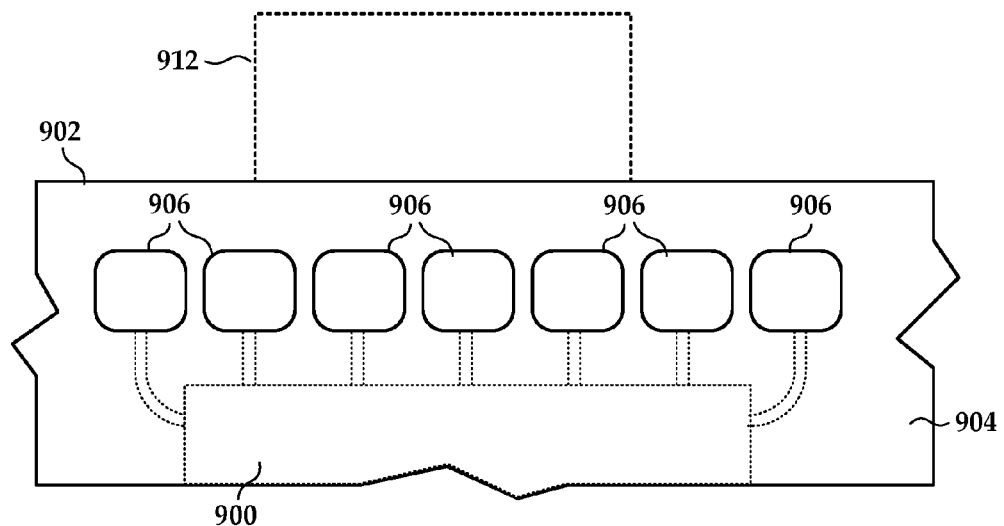

While the above examples show a switch network that is formed externally to the slider and then attached to form an integral assembly, the switch network may alternatively fabricated integrally with the slider, e.g., deposited onto the slider substrate. An example of this is shown in FIGS. 9 and 10. In FIG. 9, switch network circuitry (e.g., thin-film transistors) 900 is formed near a trailing edge 904 of a slider body 902. The slider body 902 has trailing edge pads 906 that couple the switch network circuitry 900 to a flex circuit 908 via bonds 910. In FIG. 10, a view of the trailing edge 904 shows an arrangement of the pads 906.

The trailing edge pads 906 and bonds 910 form first connections that carry signals between the slider body 902 and system circuitry (e.g., controllers, read/write channels, etc.) via the flex circuit 908. The switch network circuitry is coupled to second connections (not shown) that may also be formed via layer deposition that carry signals to internal components as described above. (e.g., read/write transducers, sensors, clearance actuators, etc.). This embodiment may be used with a HAMR read/write head, in which case an optional top-mounted LDU 912 (or other energy source and/or submount) may be used.

Figure 11:
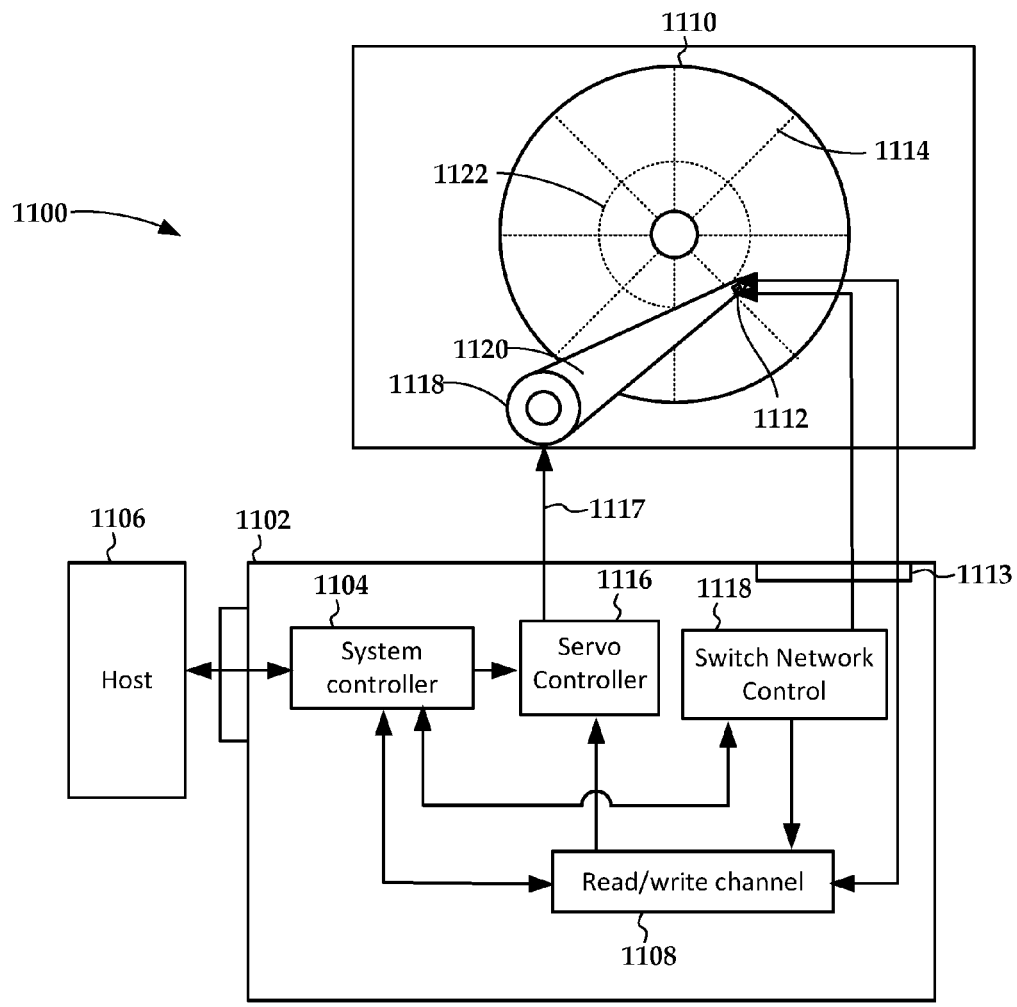
FIG. 11 is a block diagram of an apparatus according to an example embodiment.

In FIG. 11, a diagram illustrates components of a hard drive apparatus 1100 that utilizes one or more read/write heads 1112 according to an example embodiment. The apparatus includes circuitry 1102 such as a system controller 1104 that processes read and write commands and associated data from a host device 1106. The host device 1106 may include any electronic device that can be communicatively coupled to store and retrieve data from a data storage device, e.g., a computer. The system controller 1104 is coupled to a read/write channel 1108 that reads from and writes to surfaces of one or more magnetic disks 1110.

The read/write channel 1108 generally converts data between the digital signals processed by the data controller 1104 and the analog signals conducted through two or more read/write heads 1112 during read operations. To facilitate read and write operations, the read/write channel 1108 may include analog and digital circuitry such as decoders, timing-correction units, error correction units, etc. The read/write channel is coupled to the heads via interface circuitry 1113 that may include preamplifiers, filters, digital-to-analog converters, analog-to-digital converters, etc.

The read/write channel 1108 reads servo data from servo wedges 1114 on the magnetic disk 1110. These signals are sent to a servo controller 1116, which uses the signals to provide position control signals 1117 to a VCM 1118. The VCM 1118 rotates an arm 1120 upon which the read/write heads 1112 are mounted in response to the control signals 1117.

At least one of the read/write heads 1112 includes a set of components such as clearance actuators, read/write transducers, sensors, lasers, etc. The read/write heads 1112 include a switch network coupled to the set of components. The switch network is configured to, in response to a control signal, c selected sub-combination of the components to a common set of signal lines, the coupling of the selected sub-combination facilitating operation in a selected mode of the read/write head. The control signals that perform this switching are provided by a head switch network control module 1118, and may be sent via preamplifier of interface circuitry 1113.

The head switch network control module 1118 communicates with the read/write heads 1112 either directly or via read/write channel 1108. The head switch network control module 1118 at least provides analog and/or digital switching signals that reconfigure the read/write heads 1112 to operating in different modes as described herein. The head switch network control module 1118 may operate under control of the system controller 1104, e.g., based on a current zone of the disks 1110 being read from or written to, based on the apparatus being in an operational mode or recovery mode, based on the apparatus operating in conventional modes (e.g., conventional 1-D perpendicular recording) or other modes (e.g., TDMR, MSMR, IMR, SMR).

The changes made to the read/write heads 1112 via the head switch network control module 1118 may also induce changes to other control systems. For example, the servo controller 1116 may apply tracking changes to account for different locations of a currently selected group of transducers. A clearance control module (not shown) may also change its behavior based on a currently selected set of clearance actuators in the read/write heads 1112. Changing a location of currently used read/write transducers of the heads 1112 may also change clearance control parameters.

Figure 12:
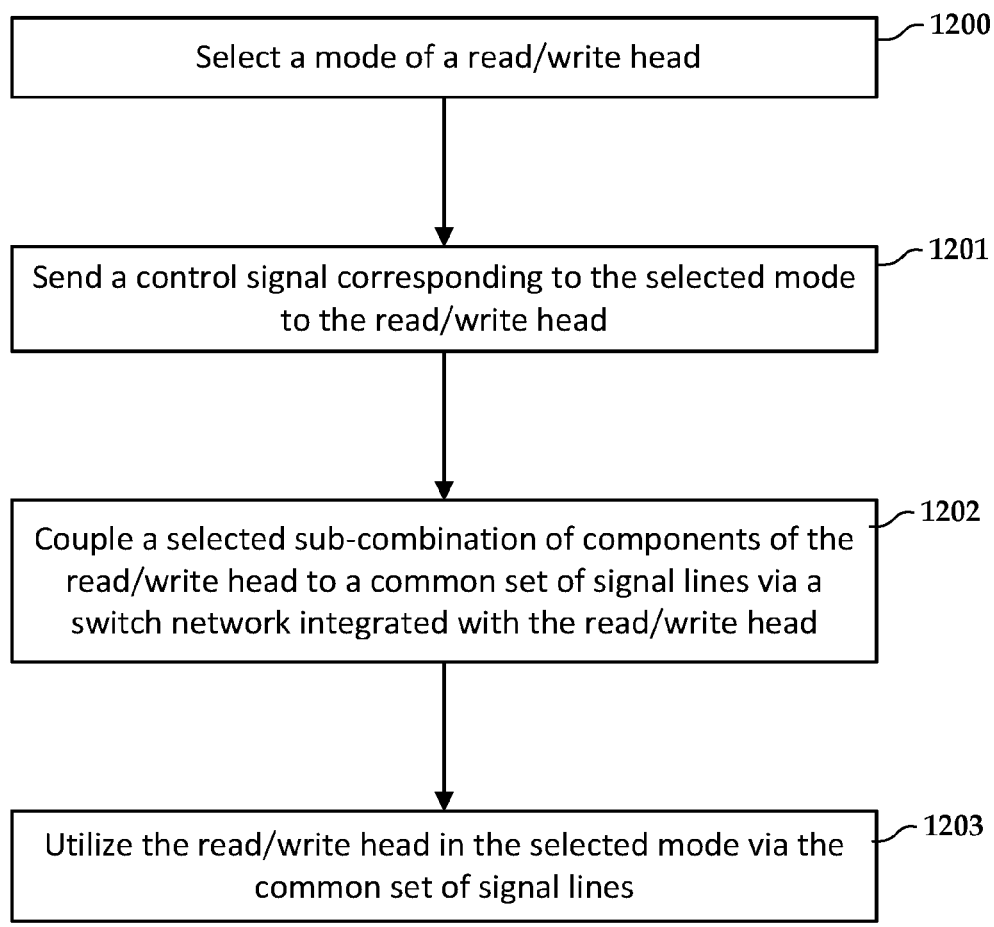
FIG. 12 is a flowchart showing a method according to an example embodiment.

In reference now to FIG. 12, a flowchart illustrates a method according to an example embodiment. The method involves selecting 1200 from one of a plurality of modes of a read/write head. A control signal is sent 1201 to the read/write head. The control signal corresponds to the selected mode. In response to the control signal, a selected sub-combination of a set of components of the read/write head is coupled 1202 to a common set of signal lines via a switch network integrated with the read/write head. The set of components at least includes: a read transducer and a write transducer configured to respectively read from and write to a magnetic recording medium; and at least one clearance actuator. The read/write head is utilized 1203 in the selected mode via the common set of signal lines.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A read/write head, comprising:
    a set of components that includes: at least one clearance actuator; at least one read transducer configured to read from a magnetic recording medium and at least one write transducer configured write to the magnetic recording medium; and
    a switch network coupled between the set of components and a common set of signal lines of a flex circuit, the switch network configured to, in response to a control signal, coupling a selected sub-combination of the components to the common set of signal lines, the coupling of the selected sub-combination facilitating operation in a selected mode of the read/write head.

2. The read/write head of claim 1, wherein the set of components further comprises a thermal sensor configured to detect a head-to-media clearance induced by the clearance actuator.

3. The read/write head of claim 2, wherein the switch network is preconfigured to select from:
    a first sub-combination comprising the read transducer and the clearance actuator and corresponding to a read mode of the read/write head;
    a second sub-combination comprising the write transducer and the clearance actuator and corresponding to a write mode of the read/write head; and
    a third sub-combination comprising the clearance actuator and the thermal sensor and corresponding to a clearance detection mode of the read/write head.

4. The read/write head of claim 3, wherein the set of components further comprises a second read transducer and a laser, wherein the at least one clearance actuator comprises a reader clearance actuator and a writer clearance actuator, and wherein:
    the first sub-combination comprises the read transducer, the second read transducer, and the reader clearance actuator;
    the second sub-combination comprising the write clearance actuator, the laser, and the writer clearance actuator; and
    the third sub-combination comprises the reader clearance actuator, the writer clearance actuator, and the sensor.

5. The read/write head of claim 1, wherein the switch network is coupled to one or more select lines providing binary values, the control signal comprising a combination of the binary values.

6. The read/write head of claim 1, wherein the switch network is coupled to a clock line and a program line, the control signal comprising a time-series of bits received via the program line.

7. The read/write head of claim 1, wherein the switch network comprises an external component that is bonded to the read/write head to form an integral assembly.

8. The read/write head of claim 7, wherein the switch network is configured as a laser submount.

9. The read/write head of claim 1, wherein the switch network is formed integrally to a substrate of the read/write head via layer deposition.

10. The read/write head of claim 1, wherein the switch network further comprises selectable impedance buffers to match impedances of the selected sub-combination of components.

11. The read/write head of claim 1, wherein coupling the selected sub-combination of the components to the common set of signal lines disconnects the components that are not part of the sub-combination.

12. An apparatus comprising:
control circuitry configured provide a control signal to select between two or more operational modes; and
a read/write head coupled to the control circuitry via a flex circuit, the flex circuitry comprising a common set of signal lines, the read/write head comprising:
a set of components that includes: at least one read transducer and at least one write transducer configured to respectively read from and write to a magnetic recording medium; and at least one clearance actuator; and
a switch network coupled to the set of components and configured to, in response to the control signal, coupling a selected sub-combination of the components to the common set of signal lines, the coupling of the sub-combination facilitating operation in a selected one of the two or more operational modes.

13. The apparatus of claim 12, wherein the flex circuit further comprises one or more select lines providing binary values, the control signal comprising a combination of the binary values.

14. The apparatus of claim 12, wherein the flex circuit further comprises a clock line and a program line, the control signal comprising a time-series of bits received via the program line.

15. The apparatus of claim 12, wherein the switch network comprises an external component that is bonded to the read/write head to form an integral assembly.

16. The apparatus of claim 15, wherein the switch network is configured as a laser submount.

17. The apparatus of claim 12, wherein the switch network is formed integrally to a substrate of the read/write head via layer deposition.

18. The apparatus of claim 12, wherein the switch network further comprises first selectable impedance buffers to match impedances of the selected sub-combination of components with second selectable impedance buffers of the control circuitry.

19. A method comprising:
selecting from one of a plurality of modes of a read/write head;
sending a control signal to the read/write head via a flex circuit, the control signal corresponding to the selected mode;
in response to the control signal, coupling a selected sub-combination of a set of components of the read/write head to a common set of signal lines of the flex circuit via a switch network integrated with the read/write head, the switch network coupled between the set of components and the flex circuit, the set of components including: a read transducer and a write transducer configured to respectively read from and write to a magnetic recording medium; and at least one clearance actuator; and
utilizing the read/write head in the selected mode via the common set of signal lines.

20. The method of claim 19, further comprising selecting first impedance buffers of the switch network to match impedances of the selected sub-combination of components with second impedance buffers of the control circuitry.

21. The method of claim 19, wherein the switch network is preconfigured to select from:
a first sub-combination comprising the read transducer and the clearance actuator and corresponding to a read mode of the read/write head;
a second sub-combination comprising the write transducer and the clearance actuator and corresponding to a write mode of the read/write head; and
a third sub-combination comprising the clearance actuator and the thermal sensor and corresponding to a clearance detection mode of the read/write head.

* * * * *